(12) United States Patent
Previero

(10) Patent No.: US 7,824,502 B2
(45) Date of Patent: Nov. 2, 2010

(54) METHOD AND SYSTEM FOR REMOVING AND SEPARATING LABELS, CAPS AND CONTAMINANTS IN GENERAL FROM BOTTLES AND CONTAINERS OF PLASTIC MATERIAL

(75) Inventor: Flavio Previero, Lipomo (IT)

(73) Assignee: Previero N. S.r.l., Anzano del Parco (IT)

( * ) Notice: Subject to any disclaimer, the term of this patent is extended or adjusted under 35 U.S.C. 154(b) by 0 days.

(21) Appl. No.: 12/677,264

(22) PCT Filed: Sep. 2, 2008

(86) PCT No.: PCT/EP2008/007148

§ 371 (c)(1),
(2), (4) Date: Mar. 9, 2010

(87) PCT Pub. No.: WO2009/033587

PCT Pub. Date: Mar. 19, 2009

(65) Prior Publication Data

US 2010/0192983 A1 Aug. 5, 2010

(30) Foreign Application Priority Data

Sep. 13, 2007 (IT) ...................... MI2007A001759

(51) Int. Cl.
*B08B 9/00* (2006.01)

(52) U.S. Cl. .............................. 134/23; 134/33; 494/23; 494/37

(58) Field of Classification Search ....................... None
See application file for complete search history.

(56) References Cited

U.S. PATENT DOCUMENTS

| 4,209,344 A | 6/1980 | Simon et al. |
| 5,115,987 A | 5/1992 | Mithal |
| 5,257,740 A | 11/1993 | Prew et al. |

FOREIGN PATENT DOCUMENTS

DE     10308500     9/2004

OTHER PUBLICATIONS

International Search Report dated Dec. 5, 2008, in PCT application.
Written Opinion in the PCT application, dated Dec. 5, 2008.

*Primary Examiner*—Michael Kornakov
*Assistant Examiner*—Eric Golightly
(74) *Attorney, Agent, or Firm*—Young & Thompson

(57) ABSTRACT

Tubular labels and contaminants can be removed from containers and/or bottles of plastic material to be recycled, by subjecting the containers and/or bottles to a first weak mechanical washing and slow centrifugating action, followed by a separation step for separating the removed labels and contaminants from the containers. The containers are subsequently subjected to a second strong mechanical washing and fast centrifugating action for the removal from the containers and/or bottles of any residual labels and contaminants.

11 Claims, 4 Drawing Sheets

METHOD AND SYSTEM FOR REMOVING AND SEPARATING LABELS, CAPS AND CONTAMINANTS IN GENERAL FROM BOTTLES AND CONTAINERS OF PLASTIC MATERIAL

BACKGROUND OF THE INVENTION

This invention concerns a method for removing and separating labels, caps and contaminants in general from bottles, containers and the like of plastic material, within a process for recovering and recycling the same plastic material; the invention also refers to a system for carrying out the aforementioned method, according to which use is made of a mechanical centrifugating action for washing and removing the labels and contaminants from the bottles.

For the purposes of the following description, the term "containers" is understood to generically mean bottles, receptacles and containers, of recyclable plastic material, such as PET or similar; also for the purposes of the following description, the term "contaminants" is understood to mean both any possible dirt on the containers, and plastic bags or other foreign bodies accompanying the same containers to be recycled, as well as any caps and/or collars attached to the containers which, being made of a different plastic material with respect to that of the same containers, must absolutely be removed in order to obtain a recovered plastic material having the necessary purity degree.

STATE OF THE ART

In general, the known processes for recovering and recycling plastic material, in particular containers and/or bottles deriving from urban and/or industrial waste, comprise a step of washing and removing labels, caps and other contaminants from the containers, by means of suitable washing apparatuses, and a following step of separating the labels and contaminants from the treated containers, at the outlet of the washing apparatus, or subsequently along a processing line for recycling the material.

Conventionally, two different types of washing apparatuses are known and used: a first type comprising a rotating drum and a second type operating by centrifugating action.

A washing apparatus of the first type mentioned, for example described in U.S. Pat. No. 6,752,192 B2 and EP-A-0 558 528, comprises a rotating drum into which are introduced containers and/or bottles of plastic material having labels and contaminants to be removed, and a certain quantity of a hot washing fluid, for example hot water with chemical additives.

The drum is internally provided with a helical screw or finning, in such a way that, when it is made to rotate at low speed, it brings in agitation the washing fluid and the containers, causing the detachment of part of the labels, caps and contaminants.

These apparatuses however are not suitable for totally and efficiently removing the more and more widespreadly used tubular labels of plastic material, as well as part of the caps and relevant collars, due to the weak mechanical agitating action exerted on the containers within the rotating drum.

This is a considerable limitation to the use of similar apparatuses, in that the presence of residual contaminants beyond a certain limit, currently indicated at a particularly low value of approximately 2 p.p.m., wouldn't allow to obtain a recovered plastic material having an industrially acceptable purity degree.

On the other hand, the possibility of removing and subsequently recovering caps and/or collars from the containers would offer a greater economic advantage, due to the high value of the material, usually polyethene, from which they are made.

Moreover, when an automatic selection of the containers is carried out, the optical sensing devices used for the selection would tend to discard those containers which still retain part of the tubular plastic labels, the caps and/or collars, thereby involving a considerable loss of valuable material.

Lastly, the use of similar apparatuses entails a high consumption of washing fluid and chemical additives, together with the relevant costs of treatment and problems of disposal, as well as a high power expenditure for heating the fluid itself.

As an alternative to this solution, as mentioned previously, use may be made of centrifugating washing apparatuses, which conventionally comprise a rotor, which is made to rotate at high speed, coaxially inside a tubular grid, into which a washing fluid is fed.

The efficiency of this second solution however, proves to be a compromise between the need to achieve the satisfactory removal of the contaminants, in particular of the tubular labels of plastic material, for which very high centrifugating speeds would be required, and the need to obtain an effective recover of plastic material to be recycled, for which more limited centrifugating speeds would be required, so as not to cause the rupture of the necks of the bottles, which would otherwise be lost during a subsequent step of separating the contaminants from the treated bottles.

Moreover, within the conventionally used recovering and recycling processes, both the aforementioned types of washing apparatuses entail a subsequent separation step by floatation of the containers from the contaminants, by means of the use of suitable tanks containing considerable quantities of water and chemical additives, with consequent high costs for the purification and disposal of the water itself.

Consequently there is a need to seek a new solution whereby it is possible to achieve the efficient removal of all types of labels, including tubular labels of plastic material, as well as the contaminants in general from bottles and/or containers of plastic material, at the same time guaranteeing a high degree of efficiency in the recovery of material to be recycled and a limited use of power and washing fluid.

OBJECTS OF THE INVENTION

The main object of this invention is therefore to provide a method and a system for removing and separating labels and contaminants in general from containers and/or bottles of plastic material, as part of a process for recovering and recycling of the aforesaid material, which allow to fulfill the aforementioned needs.

In particular, one object of the invention is to provide a method and a system of the type indicated, which allow to remove any types of labels from the containers, including those made of heat-shrinkable plastic material and/or those of the tubular type, and allow to remove the caps and relevant collars, at the same time permitting to increase the efficiency in the recovery of plastic material to be recycled.

A further object of the invention is to provide a method and a system of the aforementioned kind, whereby, thanks to the efficient removal and separation of the labels and contaminants, it is possible to obtain a recovered plastic material having a residual quantity of the same contaminants always below the requested limit of 2 p.p.m.

Another further object of the invention is to provide a method and a system of the aforementioned kind, which allow a considerable saving of processing costs, in terms of less use of washing fluid and chemical additives, as well as in terms of less power consumption.

BRIEF DESCRIPTION OF THE INVENTION

According to a first feature of the invention, the foregoing can be achieved by means of a method for removing and separating labels, in particular tubular labels, and contaminants in general from containers of plastic material to be recycled, in particular bottles, according to which the containers are subjected to a washing action and to a mechanical centrifugating action for the removal of the labels and contaminants, and in which the removed labels and contaminants are subsequently separated from the containers, characterised by the steps of:

subjecting the containers to be treated to a first weak action of mechanical centrifugation and removal of the labels and the contaminants in a washing fluid, said first weak mechanical centrifugating action being such as to impose on the containers a circumferential speed lower than 45 m/s, of such intensity as to maintain the containers substantially unbroken;

carrying out a first separation of the removed labels and contaminants, from the containers;

subjecting again the containers to a second strong action of mechanical centrifugation and removal of the residual labels and contaminants in a washing fluid, said second strong mechanical centrifugating action being such as to impose on the containers a circumferential speed higher than 55 m/s, of such intensity as to cause the detachment of the remaining labels and contaminants.

According to a further feature of the invention, the foregoing can be achieved by means of a system for removing and separating labels, in particular tubular labels, and contaminants in general from containers of plastic material to be recycled, in particular bottles, in which the removal of the labels and the contaminants takes place by means of centrifugating apparatuses for the containers, characterised by comprising:

a first washing and slowly centrifugating apparatus for the containers for the removal of the labels and the contaminants, said first apparatus comprising first rotary centrifugating means movable within a tubular element, feeding means for a washing fluid inside the tubular element, and drive means for operating said centrifugating means at such a rotational speed as to impose on the containers a circumferential speed lower than 45 m/s;

a first separation apparatus for separating the removed labels and contaminants, from the treated containers, downstream to said first centrifugating apparatus; and a subsequent second washing and fast centrifugating apparatus for the removal of the residual labels and contaminants from the containers treated by said first separating apparatus, said second centrifugating apparatus comprising second rotary centrifugating means movable within a tubular element, feeding means for a washing fluid inside the tubular element, and drive means for operating said centrifugating means at such a rotational speed as to impose on the containers a circumferential speed higher than 55 m/s.

BRIEF DESCRIPTION OF THE DRAWINGS

These and further characteristics according to this invention, will be more clearly evident from the following description with reference to the accompanying drawings, in which.

DETAILED DESCRIPTION OF THE INVENTION

The general characteristics of this invention will be illustrated hereunder by means of several exemplificative embodiments.

Figure 1:
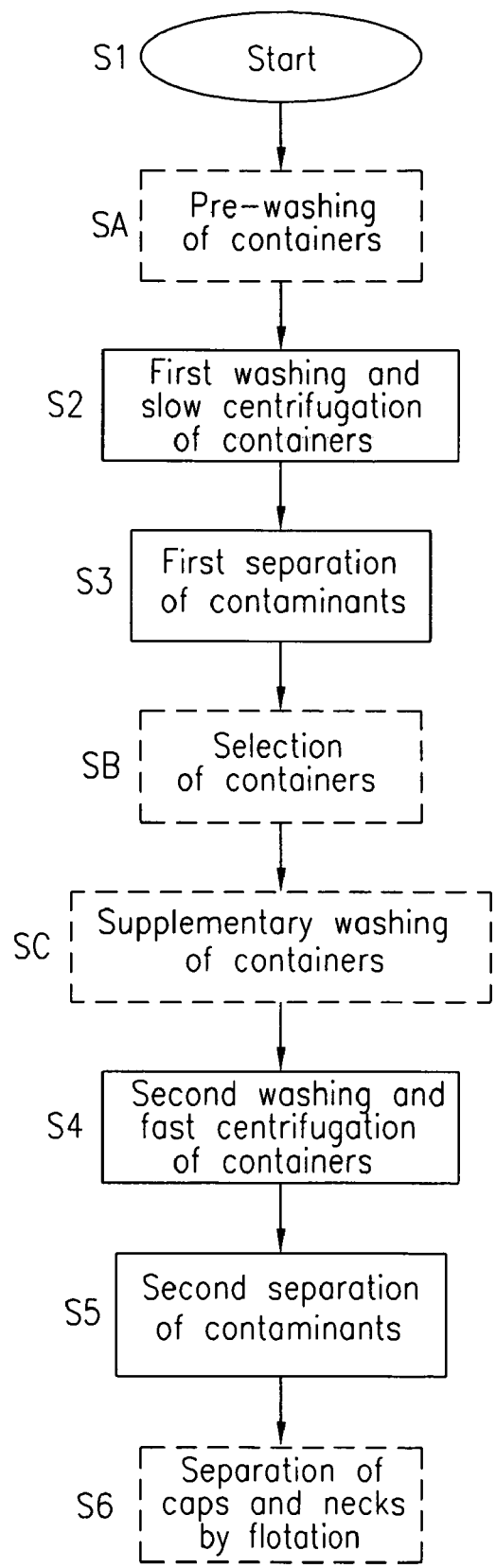
FIG. 1 shows a block diagram illustrating the method for removing and separating labels and contaminants in general from containers of plastic material to be recycled, according to this invention.

FIG. 1 represents a block diagram illustrating the method for the removal and separation of labels and contaminants in general from containers of plastic material to be recycled, for example bottles of PET, according to this invention.

The method according to the invention, which finds use within a process for recovering and recycling of plastic material, such as containers and/or bottles deriving from urban and/or industrial waste, can be preferentially carried out by the system illustrated in the Figures from 2 to 6, as described further on.

The method, as illustrated in FIG. 1, first of all comprises a start-up step S1, in which the containers and/or bottles are prepared to be treated, for example by opening any bales composed of containers compressed together.

This first step is preferentially followed by a step SA consisting of prewashing the containers, to be carried out prior to a first step S2 of washing and centrifugation of the same containers, as described further on; during the preliminary prewashing step SA, the containers are fed into a washing fluid and a turbulent action is generated in the fluid itself for agitating the containers, in order to soften and detach the labels and contaminants.

The washing fluid for such prewashing, as well as for the subsequent treatment step, can for example consist of water at room temperature or, in the event of particularly contaminated containers, hot water with or without any chemical additives.

After the step S1 and the preferential step SA, the method according to the invention, comprises, as mentioned previously, a first step S2 of washing and slow centrifugation, in which the containers to be treated, fed in the form of a stream of material, are subjected to a first weak mechanical centrifugating action for the removal of labels and contaminants in a washing fluid; in particular, the first weak centrifugating action is such as to impose on the containers a circumferential speed lower than 45 m/s, of such intensity as to maintain the containers substantially unbroken.

During the aforesaid first step of slow centrifugation S2, a first removal of a lot of the contaminants is carried out, in particular less persistent contaminants such as paper labels, part of the caps, and various types of dirt, which are also partly separated from the stream of containers through a suitable tubular grid, as explained further on.

Moreover, thanks to the limited speed of centrifugation, the containers do not suffer any substantial breakages, with particular reference to the necks of the bottles, thereby preventing subsequent consistent losses of valuable material during the separation of the contaminants from the containers.

In order to achieve an optimisation of the above, the circumferential speed can preferentially be chosen within the value range between 20 and 40 m/s.

After the first centrifugation step S2, a first separation step S3 is carried out, in which the labels and the contaminants removed from the containers during the step S2, are separated from the same containers; this separation is preferentially carried out by means of a combined action of a mechanical type, by which the residual contaminants of small dimensions, such as loose caps, are separated by screening, and of an aerodynamic type, by which the lightweight contaminants, such as films, plastic labels and the like, are separated, as explained further on.

Subsequently to the first separation step S3, if necessary, it is possible to provide an intermediate step SB of automatic and/or manual selection of the containers in relation to the materials and/or the colours of the same ones, in such a way as to be able to carry out the subsequent treatment steps on containers having the same characteristics.

Also subsequently to the first separation step S3, in the event of the containers being particularly contaminated, it is possible to provide a supplementary intermediate washing step SC for washing the containers, prior to a second step of fast centrifugation, as explained further on; this supplementary washing step in particular consists in feeding the containers into a washing fluid and in generating a turbulent action in the fluid itself for agitating the containers, tending to soften and detach the contaminants.

After the first separation step S3 and the possible intermediate steps SB and SC, the method according to the invention comprises a second washing and fast centrifugation step S4, in which the containers are subjected to a second strong mechanical centrifugating action for the removal of the residual labels and contaminants in a washing fluid; the second strong mechanical centrifugating action is in particular such as to impose on the containers a circumferential speed higher than 55 m/s, preferentially comprised between 65 and 75 m/s, of such intensity as to cause the detachment of the remaining contaminants.

The circumferential speed in particular is determined in relation to the type of bottles to be treated, with specific reference to the weight of the individual bottles and to the viscosity of the material of the latter.

Thanks to the violent mechanical action exerted on the containers in this step, all the residual labels, including those made of heat-shrinkable plastic material and/or those of the tubular type, as well as any caps and relevant collars are removed from the containers.

In this step, the necks of the bottles can also be broken, encouraging in this way the removal of the collars, but without causing a loss of valuable material; in fact, thanks to the limited quantity of contaminants present at this stage, the broken necks can be very easily recovered during a subsequent separation step, as explained further on.

The method according to the invention, thanks to this double washing and centrifugating steps at differentiated speeds, and to the presence of the intermediate separation step for the contaminants, offers the possibility of removing all types of labels from the containers, including, as mentioned, those of heat-shrinkable plastic material and/or those of the tubular type, and offers the possibility of removing all the caps and relevant collars and at the same time, prevents the broken necks of the bottles from being lost, thereby increasing the efficiency in the recovery of plastic material to be recycled.

Moreover, the method according to the invention, allows a considerable saving in processing costs, in that it offers the possibility of obtaining an end treated material having an extremely low content of contaminants, which therefore requires limited subsequent treatments in order to eliminate the same contaminants; in this way it is possible to limit the use of washing fluid and of chemical additives, which are expensive both in terms of treatment and of disposal.

In addition, the method according to the invention, thanks to its particular efficacy, offers the possibility of limiting, to a value constantly lower than the limit of 2 p.p.m., the presence of residual contaminants in the recovered plastic material, and can be carried out by using a washing fluid at room temperature, thereby also achieving a lower power consumption.

Still with reference to FIG. 1, the method, subsequently to the second centrifugation step S4 of the containers, preferentially comprises a second separation step S5 for separating the removed labels and contaminants from the containers themselves; again, this separation step can for example be carried out by means of a combined action of a mechanical type, by which the pieces of small dimensions, such as the necks of the bottles, the residual caps and the relevant collars are separated by screening, and of an aerodynamic type, by which the residual lightweight contaminations, such as the plastic labels and the like are separated, as explained further on.

Lastly, subsequently to the second separation step S5 for the contaminants, the method preferentially comprises another further separation step S6, in which the caps and the collars are separated from the broken necks of the containers by floatation, by using the different density and floatability of the relevant materials.

Thanks to this step S6, it is thus possible to recover the necks which, together with the bodies of the containers obtained at the outlet from the separation step S5, can be fed into a suitable grinding system, not shown.

The method described above can preferentially be carried out in a system according to this invention, which has been schematically illustrated in the Figures from 2 to 6.

Figure 2:
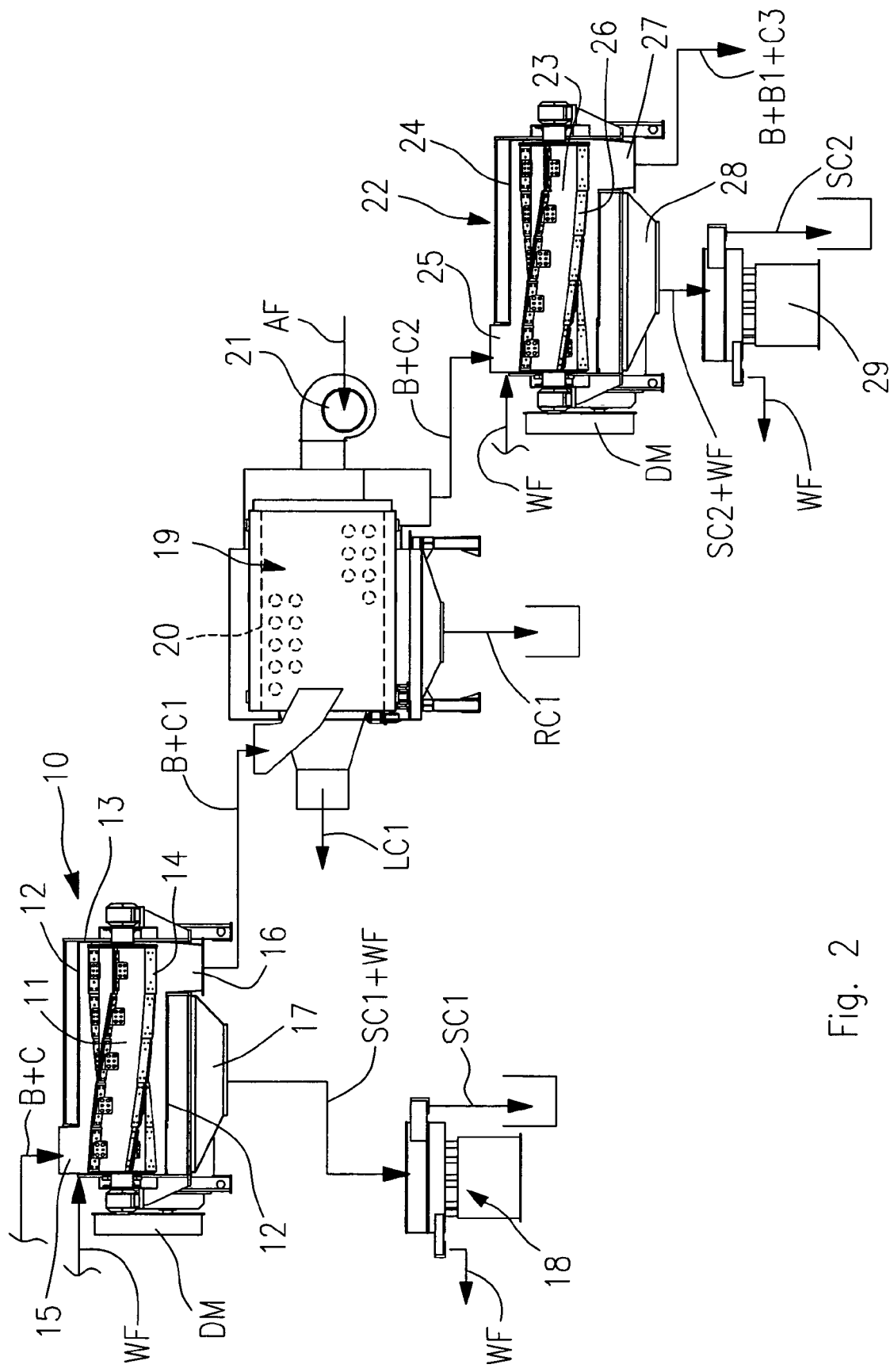
FIG. 2 shows a schematic representation of a basic system for carrying out the method according to this invention.

In particular, with reference to FIG. 2, the system for the removal and separation of labels and contaminants in general from containers of plastic material to be recycled, in particular bottles, comprises a first washing and slow centrifugating apparatus 10 for centrifugating the containers for the removal of the labels and the contaminants, which, as schematically represented, comprises first rotary centrifugating means 11 movable within a first tubular element 12 into which a washing fluid WF is fed by suitable feeding means, not shown.

Preferentially, the first rotary centrifugating means 11 comprise a cylindrical rotor, pivotally supported by an outer casing 13 of the apparatus 10, in which the rotor extends according to a longitudinal axis, coaxially inside the tubular element 12; the rotor 11 is provided with a series of fins or radial protrusions 14 which extend longitudinally according to a spiral arrangement, with a preferential angle of inclination comprised between 5° and 15°.

The tubular element 12 is preferentially in the form of a filtering grid having a polygonal cross section, having holes of a diameter comprised between 35 and 45 mm.

The centrifugating rotor 11 of said first centrifugating apparatus 10, which is operatively connected to drive means DM, for example an electric motor, is operated at such a rotational speed as to impose on the containers a circumferential speed within the tubular grid 12 lower than 45 m/s, and more preferentially comprised between 20 and 40 m/s, so as to maintain the containers substantially unbroken, as previously mentioned.

The centrifugating apparatus 10 has an inlet 15 at one end, through which a stream of containers, for example bottles B having contaminants C to be treated and removed, is fed, and has a further inlet, not shown, for feeding in the washing fluid WF.

The containers can be fed in various ways, for example pneumatically, by gravity, or by means of conveyors or the like.

The contaminated bottles B+C, during the centrifugating action carried out according to the aforementioned first washing step S2, move axially within the apparatus 10, thanks to the spiral arrangement of the fins 14, and are discharged from the latter at the end of the treatment through an outlet 16 at the opposite end; the washing fluid WF, after passing through the tubular grid 12, is discharged from a lower outlet 17, entraining with it contaminants SC1 of small dimensions and the removed paper labels, which are subsequently separated from the fluid WF for example by means of a vibrating table separating machine 18 or in any other suitable way.

The recovered fluid WF, suitably filtered and/or treated, can be advantageously re-used for feeding the centrifugating apparatus 10 and, in case, a prewashing apparatus described further on.

The treated containers, having residual contaminants, and the removed contaminants, as a whole indicated B+C1, which come out from the outlet 16, are fed into an apparatus 19 for the separation of the removed labels and contaminants from the containers, by means of which the separation step S3 is carried out; preferentially, as schematically represented, the apparatus 19 comprises a rotating tubular filter 20, having holes through which further contaminants RC1 of small dimensions, such as the loose caps, are separated by mechanical screening.

The apparatus 19 also comprises an electric fan 21 or other means capable of generating a strong forced air flow AF in an axial direction along the tubular filter, in order to also give rise to an action of an aerodynamic type, by which the lightweight contaminations LC1, such as film, plastic labels and the like are separated.

Again with reference to FIG. 2, the system according to the invention also comprises a second washing and fast centrifugating apparatus 22 for the removal of the residual labels and contaminants C2 from the containers B coming out from the separating apparatus 19.

The second centrifugating apparatus 22 preferentially has features similar to the first centrifugating apparatus 10, to which reference is made, with the difference that in this case the second rotating centrifugating means 23 have a rotational speed such as to impose on the containers a circumferential speed within the respective second tubular grid-type element 24 higher than 55 m/s, preferentially comprised between 65 and 75 m/s, by means of which the aforesaid second washing step S4 of fast centrifugation is carried out.

In particular, the centrifugating apparatus 22 has an inlet 25 at one end, through which the containers B having residual contaminants C2 are fed, and has a further inlet, not shown, for feeding in the washing fluid WF.

The residually contaminated bottles B+C2, during the centrifugating action carried out according to the aforementioned second washing step S4, move axially within the apparatus 22, thanks to the spiral arrangement of fins 26, and are discharged from the latter at the end of the treatment through an outlet 27 at the opposite end, in the form of fully washed containers B, possible broken necks B1 from the same containers, and removed contaminants C3; the washing fluid WF, after passing through the tubular grid 24, is discharged from a lower outlet 28, entraining with it further contaminants SC2 of small dimensions, which are subsequently separated from the fluid WF for example by means of a vibrating table separating machine 29 or in any other suitable way.

Also in this case, the recovered fluid WF, suitably filtered and/or treated, can be advantageously re-used for feeding the centrifugating apparatus 22.

Figure 3:
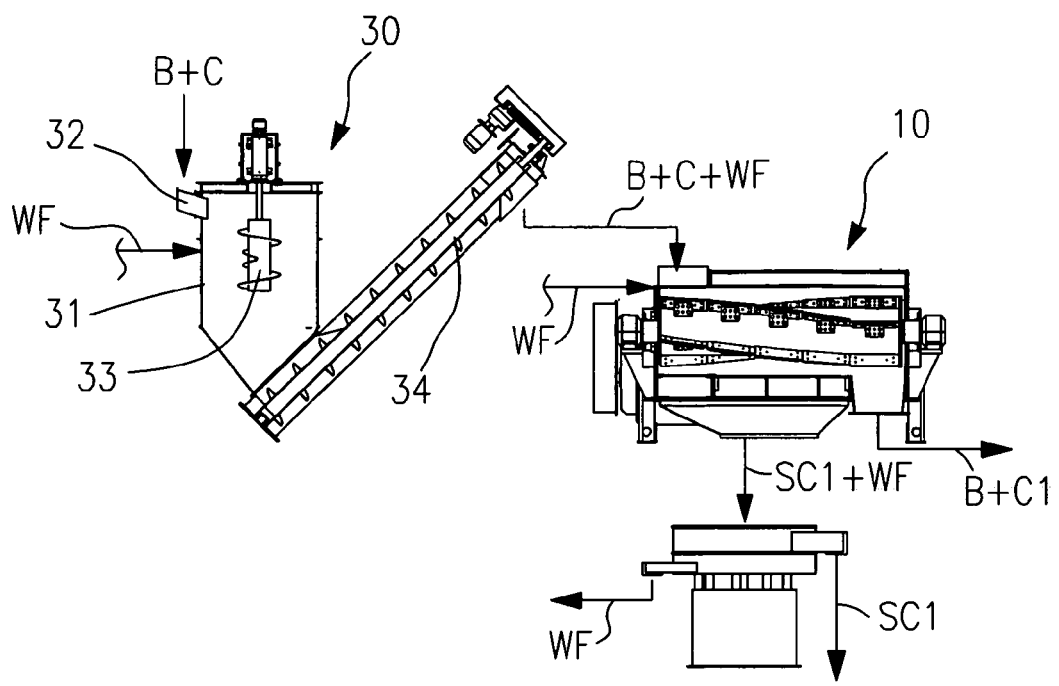
FIG. 3 shows a prewashing apparatus for the containers, which can be added to the basic system of FIG. 2, upstream to the first washing and slow centrifugating apparatus.

With reference to FIG. 3, upstream to the first washing and centrifugating apparatus 10, the system according to the invention preferentially can comprise a prewashing apparatus 30 for prewashing the containers and softening the contaminants, which in turn comprises a washing tank 31, having an inlet for feeding a washing fluid WF, for example the same which feeds the apparatus 10, as well as a feeding inlet 32 for feeding the containers B having the contaminants C to be removed, for example containers fed by a bale opening system for bales of containers compressed together.

The apparatus 30 also comprises agitating means 33 shaped and disposed for generating a turbulent motion on the containers in the washing fluid, for the purpose of carrying out the prewashing step SA described above.

The contaminated containers B+C thus treated are then fed into the first centrifugating apparatus 10 by the combined action of a screw 34 and the stream of washing fluid WF which is also fed into the centrifugating apparatus 10.

Figure 4:
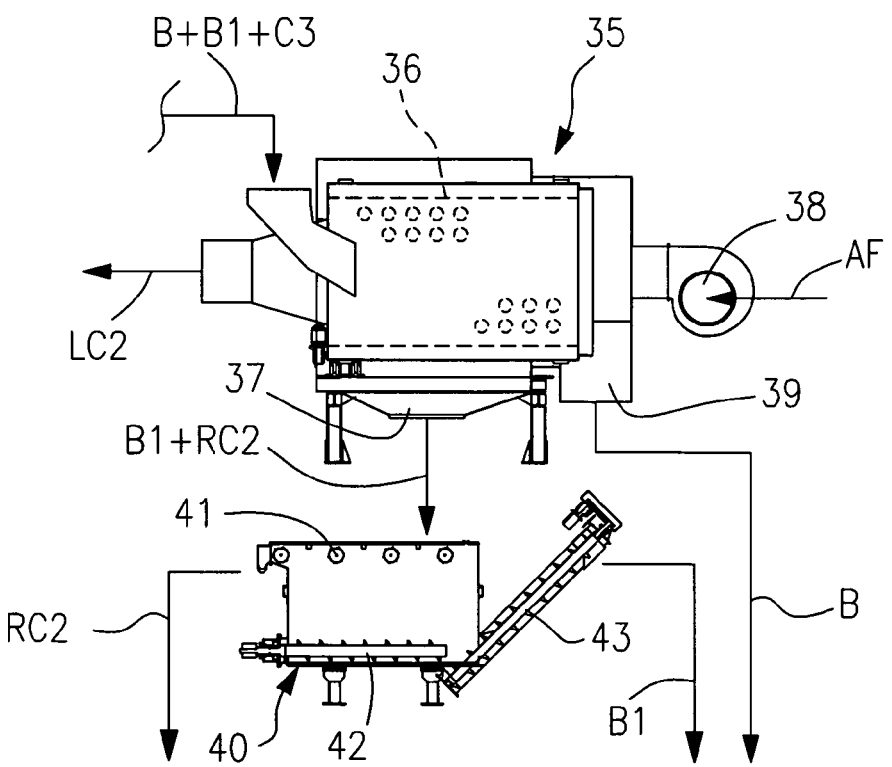
FIG. 4 shows a second separation apparatus for separating the contaminants, as well as a floatation apparatus for the separation of the caps and collars, which can be added to the basic system of FIG. 2, downstream to the second washing and fast centrifugating apparatus.

Now with reference to FIG. 4, downstream to the second washing and centrifugating apparatus 22, the system according to the invention preferentially comprises a second separating apparatus 35 for the mechanical and aerodynamic separation of the removed labels and contaminants C3, from the containers B and the necks B1 coming out from the second washing and centrifugating apparatus 22.

In particular, this second separating apparatus 35, by means of which the aforesaid second separation step S5 is carried out, has characteristics similar to the separating apparatus 19, and preferentially comprises a rotating tubular filter 36, having holes through which contaminants of small dimensions, such as the residual caps and collars RC2, as well as the necks of the bottles B1 are separated by mechanical screening and discharged through an outlet 37.

The apparatus 35 also comprises an electric fan 38 or other means capable of generating a strong forced air flow AF in an axial direction along the tubular filter 36, in order to also give rise to an action of an aerodynamic type, by which the lightweight contaminations LC2, such as film, plastic labels and the like are separated.

Finally, the separating apparatus 35 has a further outlet 39 for the discharge of the treated containers B.

The pieces of small dimensions B1+RC2 discharged from the separating apparatus 35 are subsequently treated in a further apparatus 40 for the separation of the caps RC2 and broken necks B1 by floatation, disposed downstream to the apparatus 35 itself.

This floatation apparatus 40 preferentially comprises a floatation tank in which the caps and the collars RC2 are separated from the broken necks B1 of the containers by exploiting the different density and floatability of the relevant materials; in particular, the caps and the collars are light and float, so they are removed by means of surface agitators 41, while the necks B1 sink to the bottom and are removed and discharged by means of a system of screws 42, 43.

Figure 5:
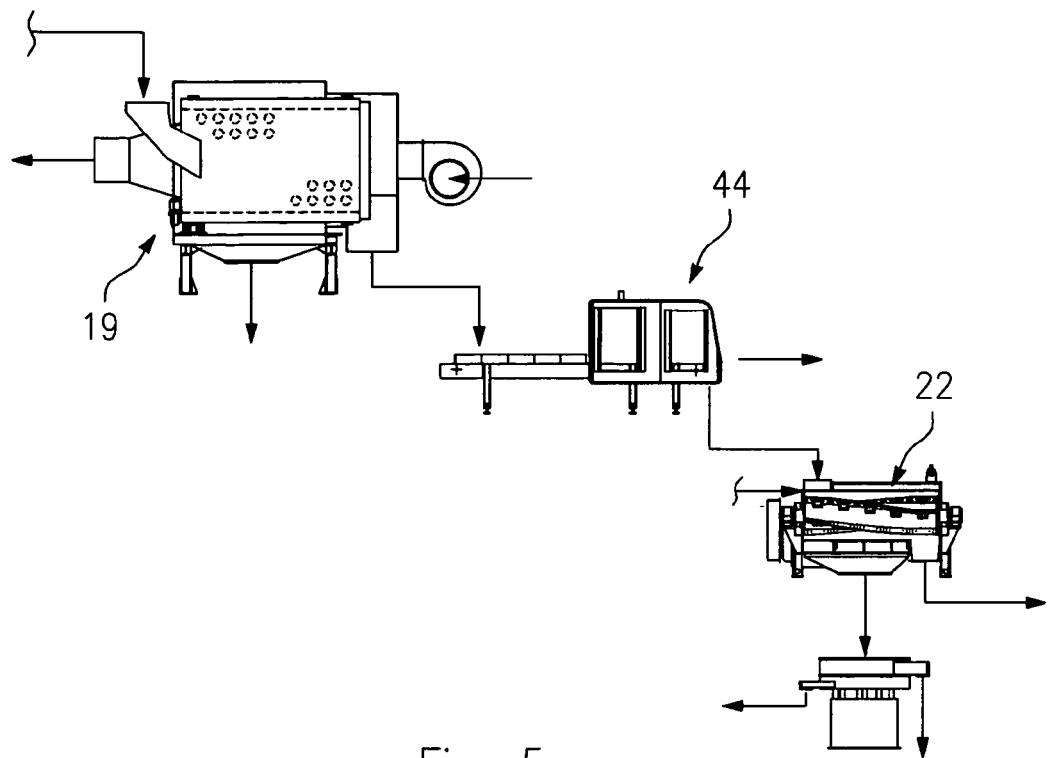
FIGS. 5 and 6 schematically represent further versions of the system of FIG. 2, respectively comprising, upstream to the second washing and fast centrifugating apparatus, a selecting apparatus for selection of materials and/or colours of the containers, and respectively a supplementary washing apparatus for the containers.

With reference to the schematic FIG. 5, downstream to the first separating apparatus 19 for separating the contaminants, the system according to the invention, can comprise a selecting apparatus 44 for an automatic and/or manual selection of the containers in relation to the materials and/or the colours of the latter.

Figure 6:
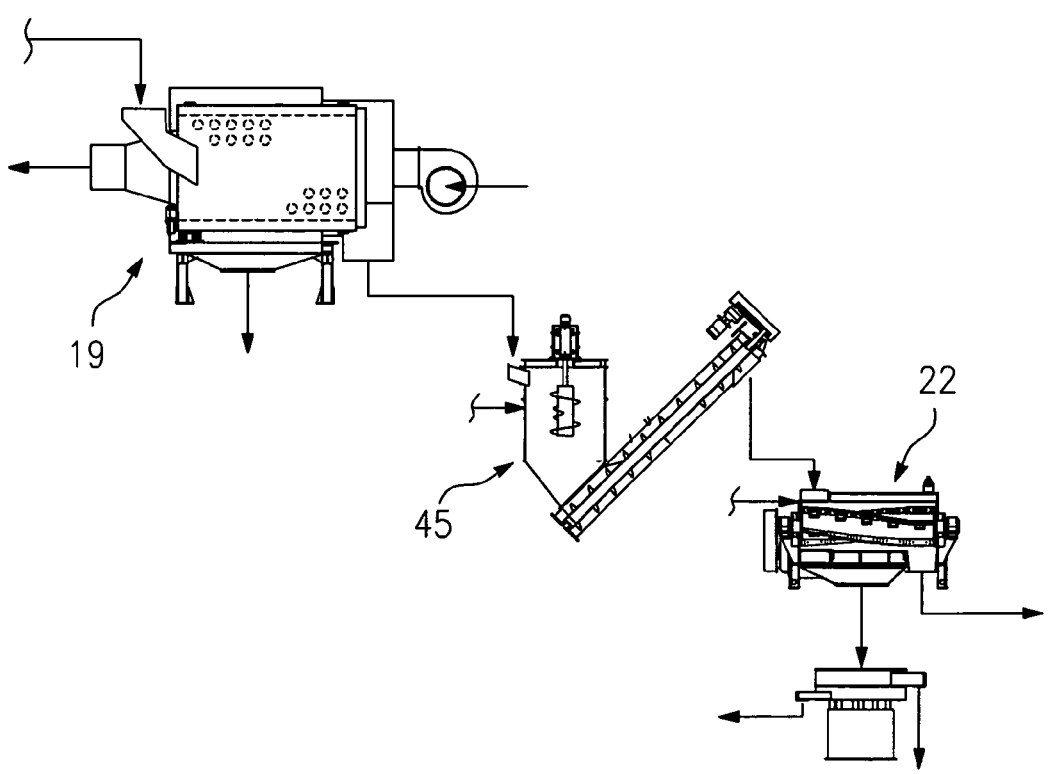

Lastly, with reference to the schematic FIG. 6, upstream to the second centrifugating apparatus 22, the system according to the invention can comprise a supplementary washing apparatus 45 for washing the containers, preferentially having characteristics similar to those of the prewashing apparatus 30 illustrated in FIG. 3, to which reference is made.

What has been described and shown with reference to the accompanying drawings, has been given purely by way of example in order to illustrate the general characteristics of the invention, as well of several of its preferential embodiments; therefore other modifications and variations to the method and the system for the removal and separation of labels and contaminants in general from containers of plastic material to be recycled are possible, without thereby deviating from the scope of the claims.

The invention claimed is:

1. A method for removing and separating labels, and contaminants in general from containers of plastic material to be recycled, according to which the containers are subjected to a washing action and to a mechanical centrifugating action for the removal of the labels and contaminants, and in which the removed labels and contaminants are subsequently separated from the containers, wherein the method comprises the steps of:
   a first centrifugation step of subjecting the containers to be treated to a first weak action of mechanical centrifugation and removal of the labels and contaminants in a washing fluid, said first weak mechanical centrifugating action being such as to impose on the containers a circumferential speed lower than 45 m/s, of such intensity as to maintain the containers substantially unbroken;
   carrying out a first separation and of the removed labels and contaminants from the containers;
   a second centrifugation step of subjecting again the containers to a second action of mechanical centrifugation, the second action of mechanical centrifugation being stronger than the first action of mechanical centrifugation, and removal of the residual labels and contaminants in a washing fluid, said second mechanical centrifugating action being such as to impose on the containers a circumferential speed higher than 55 m/s, and of such intensity as to cause the detachment of the remaining labels and contaminants.

2. The method according to claim 1, comprising a preliminary prewashing step for prewashing the containers before said first centrifugation step, said preliminary prewashing step comprising feeding the containers into a washing fluid and generating a turbulent action for agitating the containers, to soften and detach the labels and contaminants.

3. The method according to claim 1, comprising a supplementary separation step for separating the removed labels and contaminants from the containers, the supplementary separation step being subsequent to said second centrifugation step for centrifugating the containers.

4. The method according to claim 3, comprising a further separation step for separating caps and broken necks of the containers by floatation, the further separation step being subsequent to said supplementary separation step of the contaminants.

5. The method according to claim 1, further comprising an intermediate selection step for an automatic or manual selection of the containers in relation to the materials or the colours of the latter, the intermediate selection step being subsequent to said first separation step of the removed contaminants from the containers.

6. The method according to claim 1, comprising an intermediate supplementary washing step for washing the containers prior to said second centrifugation step, said supplementary washing step comprising feeding the containers into a washing fluid and a generating a turbulent action for agitating the containers, tending to soften and detach the contaminants.

7. The method according to claim 1, wherein said first mechanical centrifugating action is carried out by imposing upon the containers a circumferential speed between 20 and 40 m/s.

8. The method according to claim 1, wherein said second mechanical centrifugating action is carried out by imposing upon the containers a circumferential speed between 65 and 75 m/s.

9. The method according to claim 1, wherein said first separation of the removed labels and contaminants from the containers is carried out by combined action of a mechanical type by screening, and of an aerodynamic type.

10. The method according to claim 2, further comprising a supplementary separation step for separating the removed labels and contaminants from the containers, the supplementary separation step being subsequent to said second centrifugation step for centrifugating the containers.

11. The method according to claim 3, wherein said first separation of the removed labels and contaminants from the containers is carried out by combined action of a mechanical type by screening, and of an aerodynamic type.

* * * * *